(12) United States Patent
Robert et al.

(10) Patent No.: US 8,750,523 B2
(45) Date of Patent: *Jun. 10, 2014

(54) INTEROPERABLE DIGITAL RIGHTS MANAGEMENT

(75) Inventors: Arnaud Robert, Burbank, CA (US); Scott Watson, Marina Del Rey, CA (US); Jeffrey Lotspiech, Henderson, NV (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/427,603

(22) Filed: Mar. 22, 2012

(65) Prior Publication Data

US 2012/0224696 A1 Sep. 6, 2012

Related U.S. Application Data

(63) Continuation of application No. 11/559,240, filed on Nov. 13, 2006, now Pat. No. 8,190,918.

(51) Int. Cl.
*H04L 9/08* (2006.01)
*G06F 21/10* (2013.01)
*G06F 21/60* (2013.01)
*G06F 21/71* (2013.01)
*G11B 20/00* (2006.01)
*G06F 21/78* (2013.01)

(52) U.S. Cl.
CPC .............. *G06F 21/10* (2013.01); *G06F 21/60* (2013.01); *G06F 21/71* (2013.01); *G11B 20/00* (2013.01); *G06F 21/78* (2013.01)
USPC ................. 380/286; 713/175; 705/51; 726/26

(58) Field of Classification Search
CPC ... H04L 2209/603; G06F 21/60; G06F 21/10; G06F 21/105; G06F 21/70; G06F 21/71; G06F 21/78; G11B 20/00
USPC ................. 380/286; 713/175; 705/51; 726/26
See application file for complete search history.

(56) References Cited

U.S. PATENT DOCUMENTS 7,822,685 B1 * 10/2010 O'Toole, Jr. .................... 705/51
2005/0198510 A1 * 9/2005 Robert et al. ................. 713/175

OTHER PUBLICATIONS

Andreaux, J.P., et al.; "Copy protection system for digital home networks"; Signal Processing Magazine, IEEE vol. 21 , Issue: 2; Digital Object Identifier: 10.1109/MSP.2004.1276118 ; Publication Year: 2004 , pp. 100-108.*
Lin, E.T., et al.; "Advances in Digital Video Content Protection"; Proceedings of the IEEE vol. 93 , Issue: 1; Digital Object Identifier: 10.1109/JPROC.2004.839623 ; Publication Year: 2005 , pp. 171-183.*

* cited by examiner

*Primary Examiner* — Hadi Armouche
*Assistant Examiner* — Angela Holmes
(74) *Attorney, Agent, or Firm* — Farjami & Farjami LLP

(57) ABSTRACT

The subject matter disclosed herein relates to a method and/or system for enabling access to media content using different digital rights management formats.

12 Claims, 3 Drawing Sheets

INTEROPERABLE DIGITAL RIGHTS MANAGEMENT

This application is a continuation of U.S. patent application Ser. No. 11/559,240, filed Nov. 13, 2006, now U.S. Pat. No. 8,190,918, which is incorporated by reference in its entirety.

BACKGROUND

1. Field

The subject matter disclosed herein relates to digital rights management.

2. Information

Media content providers have used various digital rights management (DRM) technologies for controlling access to media content to, for example, prevent unauthorized copying of such media content. For example, DRM technology has been employed to protect media content such as movies and music, just to name two examples of types of media content. Using such DRM technology to prevent unauthorized access to media content, owners of such protected media content may realize more revenue for allowing authorized access to such media content than would otherwise be realized in the absence of such DRM technology.

Protected media content is typically encrypted according to a key and stored on a removable storage medium such as a CD ROM or flash card for distribution to consumers. A consumer may then access the encrypted media content by installing the removable storage medium into a device and obtaining access to the protected medium according to a DRM license. However, such a DRM license may be provided according to any one of several different incompatible DRM formats, thus limiting interoperability of the stored media content with different devices.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
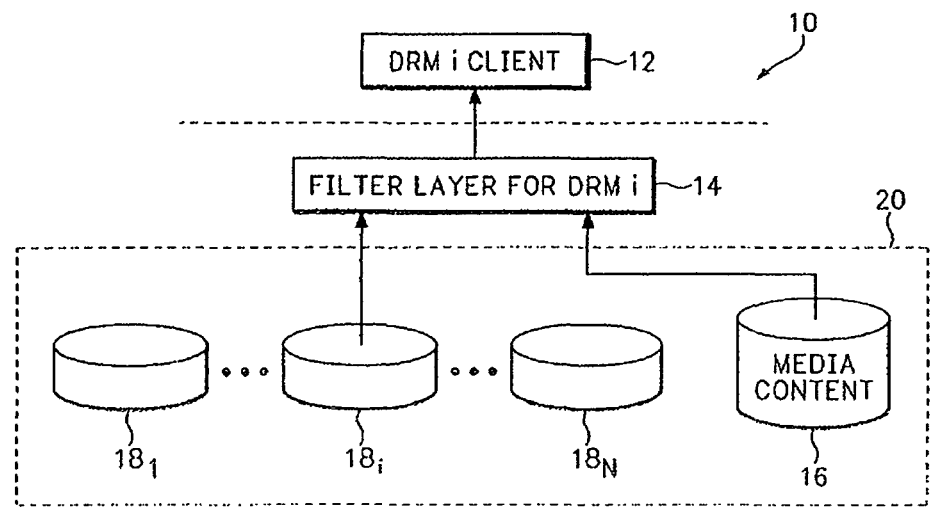
FIG. 1 is a schematic diagram of processes hosted on a device for accessing media content stored on a storage medium according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

In one embodiment, "Digital Rights Management" (DRM) refers to a system to control access to media content, grant explicit permissions to access media content using particular methods, and prevent use of such media content by unauthorized users. Such DRM may enable the secure distribution of such media content to paying consumers. In one particular embodiment, such DRM may comprise encryption of media content which may be decrypted by an authorized user for subsequent access. However, this is merely an example of DRM according to a particular embodiment and claimed subject matter is not limited in this respect.

According to an embodiment, a user may access media content by first obtaining a DRM license specifying how a user may access the media content. According to an embodiment, a DRM license may set forth specific permissions to access associated media content in a "rights expression language." Here, such a rights expression language may comprise machine-readable information defining how a user and/or application may be permitted to access associated media content and constraints and/or limits to such access. However, this is merely an example of a rights expression language and claimed subject matter is not limited in this respect.

According to an embodiment a DRM license may enable a user and/or application to access media content by providing access to a "DRM envelope." Such a DRM envelope may comprise, for example, information enabling access to encrypted media content such as an encryption key. In one embodiment, such a DRM envelope may be stored with associated media content on a storage medium. In another embodiment where media content is broadcasted, such a DRM envelope may comprise a key derived from a media key block. Here, such a media key blocks may be employed in techniques known as "broadcast encryption." However, such media key blocks may be applied to physical devices storing media content, in addition to broadcasted media content. It should understood, however, that these are merely examples of how a DRM envelope may be associated with media content and claimed subject matter is not limited in this respect.

According to an embodiment, media content may be protected according to any one of several distinct "DRM formats." To access such media content protected according to a particular DRM format, a user and/or application may obtain a DRM license provided in the particular DRM format. With such a license to access the protected media content in the particular DRM format, and using a device and/or application adapted to access media content protected according the particular DRM format, a user may access the protected media content to, for example, render a presentation threrefrom. However, merely having a DRM license provided in a first DRM format, and an application and/or device adapted to access media content protected according to the first DRM format, may not enable a user to access media content which is protected according to a second DRM format which is different from the first DRM format.

According to an embodiment, although claimed subject matter is not limited in this respect, a device to be used in rendering a presentation of media content may host an application comprising or having access to a DRM envelope in one or a limited number of DRM formats. If media content is protected according to a DRM format that is not among the limited number of formats to which the device has access to an associated DRM envelope, the device may not be able to access the protected media content. Accordingly, proliferation of different DRM formats for the distribution of media content may limit the interoperability of such protected media content for use with different devices.

Briefly, in one particular embodiment protected media content may be combined with a plurality of DRM envelopes provided according to an associated plurality of DRM formats for storage together on a storage medium. Using a device and/or application that is compatible with accessing media content protected according to at least one of the plurality of DRM formats, a user and/or application may access the protected media content by accessing an associated one of the plurality of DRM envelopes stored on the storage medium. Accordingly, a device and/or application may be enabled access to the protected media content by being compatible with at least one of the plurality of DRM formats. It should be understood, however, that this is merely an example embodiment and that claimed subject matter is not limited in this respect.

FIG. 1 illustrates an embodiment of a schematic diagram of a process for accessing media content stored on memory 20, such as a memory hosted on a portable device, according to one embodiment. Media content, for example, may comprise encoded signals or information that is representative of audio, video, text, still images and/or other data. Media content may also comprise "interactive media content" in which a rendering of a presentation may depend upon, or be affected by, inputs from a user and/or participant. Such interactive media content may comprise, for example, an interactive game. However, these are merely examples of a presentation that may be rendered based, at least in part, on a media content signal and claimed subject matter is not limited in this respect.

Such a device may comprise any one of several devices capable of accessing and rendering a presentation of, or based on, media content, such as a personal computer, personal digital assistant (PDA), cell phone, automobile sound system, MP3 player, just to name a few. Accordingly, in one embodiment, such a device may comprise output devices such as speakers and/or displays and a computing platform capable of accessing media content stored on memory 20 for rendering a presentation through such output devices. Here, such a computing platform may comprise a processor and memory (not shown) for storing and executing machine-readable instructions for hosting one or more applications. Such applications may be adapted to access the media content 16 on memory 20 that is stored according to a particular DRM format.

As pointed out above, access to the media content 20 may be protected according to any one of several DRM formats such as, for example, proprietary DRM formats including DRM formats developed by MICROSOFT®, IBM®, APPLE®, REALNETWORKS® and SONY®, just to name a few. Alternatively, access to such media content may be protected according to any one of several consortia-based DRM formats such as, for example, Open Mobile Alliance (OMA), Content Protection for Recordable media (CPRM) and Advanced Access Content System (AACS), just to name a few.

It should be understood, however, that these are merely examples of DRM formats and that claimed subject matter is not limited in this respect.

Memory 20 may comprise any type of storage medium capable, of storing information in any form, including digital form. In one particular embodiment, although claimed subject matter is not limited in this respect, memory 20 may comprise a removable non-volatile storage device that is adapted to be inserted in and/or coupled to a device for access to information stored thereon. For example, memory 20 may comprise a CD-ROM, flash card, magnetic disk, memory stick, USB device or a read-only, re-writable or recordable disc (e.g., CD, DVD, HD-DVD, Blu-Ray, etc.), just to name a few examples. However, memory 20 may comprise any type of memory medium, such as volatile or non-volatile memory devices capable of storing digital information, and claimed subject matter is not limited in this respect.

In one embodiment, memory 20 stores media content 16 in an encoded and encrypted format. For example, media content 16 may be provided in any one of several digitally encoded formats such as, for example, versions of GW, TIFF, JPEG, JPEG2000, BMP, PNG, MPEG1/2/4, WMV, H.263, H.264, VC-1, DivX, Xvid, Real Video, Nero Digital, On2, VP6, VP7 and QuickTime and/or the like. In addition to being encoded, media content 16 may be encrypted according to any variety of encryption techniques, using any one of several encryption techniques such as, for example, using the Advanced Encryption Standard (AES) as a cipher, wherein an decryption key or content access key, such as a title key for example, can be used to decrypt and access the media content 16. However, this is merely an example of one encryption format that may be used for encrypting/decrypting media content, which could use, for example, symmetric or asymmetric key cryptography, and claimed subject matter is not limited in this respect.

Memory 20 may also store a plurality of DRM envelopes 18 provided according to associated DRM formats 1 through N. According to a particular embodiment, although claimed subject matter is not limited in this respect, a user, device and/or application may obtain a content access key, such as a title key, for decrypting media content 16 by accessing any one of the DRM envelopes 18. Here, for example, a DRM envelope $18_i$ associated with a DRM format "i" may comprise or contain information comprising the content access key, which is accessible by using an application and/or device compatible with DRM format "i". Here, for example, such information in DRM envelope $18_i$ may comprise or contain a content access key, such as a title key, which may be used or accessed by such an authorized application and/or authorized device compatible with DRM format "i". Using such content access key, the authorized application and/or authorized device may decrypt media content 16 for rendering a presentation to a user. To access media content 16, accordingly, an authorized device or authorized application capable of accessing information from memory 20 (e.g., DRM envelope $18_i$) need not be compatible with any single particular DRM format, provided that the device or associated application is compatible with at least one of the DRM formats 1 through N and receives, acquires and/or contains the authorization to access the DRM envelope $18_i$, so as to facilitate or enable access to content access key associated with a particular DRM envelope $18_i$.

In one particular embodiment, although claimed subject matter is not limited in this respect, DRM envelopes 18 and media content 16 may be copied from memory 20 to a different, new memory. While the media content copied to the new memory may not be immediately accessible by a subsequent user and/or application, a content provider and/or distributor may realize additional revenue for allowing the subsequent user and/or application access to the copied media content. Here, for example, such a user may receive information or authorization from a content provider and/or distributor under a fee arrangement that enables access to a DRM envelope 18 associated with an appropriate DRM format for obtaining a content access key (thus enabling the user to access and decrypt media content 16 copied to the new memory device). If the new memory device is then again transferred or shared by the subsequent user or other third party, the media content provider and/or distributor may receive additional revenue under the fee arrangement without the expense of making and distributing such a memory device to the subsequent user.

According to an embodiment, information stored on memory 20 may be organized into files according to a predetermined file format. As such, media content 16 and DRM envelopes 18 may be organized in to files according to a file directory accessible on memory 20 at a predetermined physical memory location (not shown). Accordingly, a device capable of accessing information on memory 20 may obtain metadata from such a predetermined physical memory location to be used in individually accessing media content 16 and/or DRM envelopes 18. In an alternative embodiment, media content 16 and DRM envelopes 18 may be located in a single file on memory 20. Here, for example, such a file may comprise metadata such as tags, markers, extensions, pointers or other instruments to enable a user and/or application to locate DRM envelopes and/or media content 16 within the single file. It should be understood, however, that these are merely examples of how media content and/or DRM may be organized on a memory for access, and claimed subject matter is not limited in this respect.

In one particular embodiment, a DRM client 12 may be adapted to access media content which is protected according to a particular DRM format "i" comprising a single DRM format from among DRM formats 1 through N. In one particular embodiment, DRM client 12 may comprise an application hosted on a computing platform which is adapted to render a presentation through output devices to a user based, at least in part, on media content retrieved from memory 20. For example, DRM client may comprise decoding logic to decode media content 16 according to one or more of the aforementioned encoding formats. Such an application may comprise, for example, versions of media players such as Windows Media Player provided by MICROSOFT®, Flash Player provided by ADBOBE® RealPlayer provided by REALNETWORKS® and QuickTime provided by APPLE®, just to name a few. In other embodiments, DRM client 12 may comprise a proprietary embedded application on a device such as a cell phone, PDA, iPOD provided by Apple Computer Inc., game platform, MP3 player, just to name a few examples. However, these are merely examples of applications comprising logic to decode encoded media content for presentation to a user and claimed subject matter is not limited in this respect.

In the illustrated embodiment, DRM client 12 may comprise a decryption cipher (e.g., an AES compatible decryption cipher) or envelope access key which may be adapted to decrypt an associated DRM envelope 18 and/or media content 16. By having an associated envelope access key to decrypt an associated DRM envelope $18_i$, DRM client 12 may obtain a content access key to decrypt media content 16 as illustrated above. As such, access to the content access key via an envelope access key may be provided by the device or memory itself (e.g., DRM client 12, authorized device serial number, authorized memory serial number, pre-loaded authorization keys, etc.). Alternately, in one embodiment, access to the content access key via an envelope access key may be provided by for example, in conjunction with a device or memory resident authorization, such as in conjunction with a registration of the device or memory. In one embodiment, DRM client 12 may directly access DRM envelopes 18 and/or media content 16 stored on memory 12 through an operating system (not shown). In an alternative embodiment, and as illustrated in FIG. 1, DRM client 12 may access DRM envelopes 18 and/or media content 16 through a filter layer 14 which is capable executing of input/output (I/O) operations, such as open, read, write, close, etc., in connection with memory 20. Such a filter layer 14 may be developed in any one of several programming languages, such as C++, Java and Postscript to name a few examples, having explicit syntax for such I/O operations. It should be understood, however, that use of explicit filter syntax in a programming language is merely one technique for implanting filter layer 14 according to a particular embodiment, and that filter layer 14 may be constructed from lower-level programming constructs, for example. Here, filter layer 14 may provide a higher level abstraction interface that is adapted to communicate with different DRM clients from different vendors and adapted for use with different DRM formats. In one embodiment, filter layer 14 may enable DRM client 12 to directly execute I/O operation, but potentially intervene to transform information retrieved from memory 20 to be in a format that may be processed by DRM client 12.

Figure 2A:
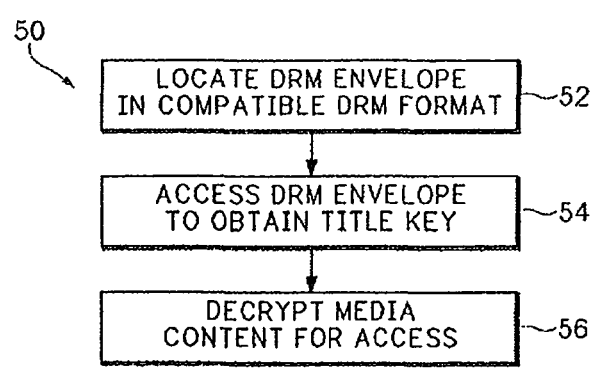
FIG. 2A is a flow diagram illustrating a process for accessing media content protected using a digital rights management (DRM) format.

FIG. 2A is a flow diagram illustrating a process 50 for accessing media content according to a DRM format according to an embodiment of processes illustrated in FIG. 1. At block 52, DRM client 12 may access memory 20 to locate a DRM envelope $18_i$ by, for example, accessing metadata stored on memory 20 illustrated above according to a particular embodiment. For example, DRM client 12 and/or filter 14 may identify files, tags, extensions, markers, pointers or other instruments which are associated with a physical location in memory 20 of a DRM envelope 18 that is provided according to a particular DRM format that is compatible with DRM client 12. At block 54, DRM client 12 and/or filter 14 may retrieve and/or access the DRM envelope from the location in memory 20 and decrypt information in the retrieved DRM envelop to obtain the decryption key, such as the a title key, as illustrated above. DRM client 12 may then decrypt media content 16 using the decryption key as illustrated above, and decode the decrypted media content for rendering a presentation therefrom.

As illustrated above, an authorized user may access media content 16 by, for example, accessing a particular DRM envelope 18 to obtain a decryption key for decrypting media content 16. Once decrypted, however, it might be possible that media content 16 could be copied, reproduced and/or distributed in a manner that is not authorized, if appropriate DRM controls are not in place. In the event that decrypted media content 16 is used in an unauthorized manner, it may be desirable to identify which particular DRM format 1 through N was utilized for enabling unauthorized used of media content 16.

According to an embodiment, a portion of media content 16 may be encrypted according to a primary content encryption key while a second, smaller portion may comprise segments encrypted according to associated secondary content encryption keys associated with different DRM formats 1 through N. Here, the portion of media content 16 encrypted according to the primary content encryption key may comprise a portion desired by a user to be rendered for presentation. If decrypted, a segment in the second portion of media content 16 may reveal a distinct marking imparted in the portion decrypted by the corresponding primary content decryption key and/or reveal a distinct marking in a presentation of media content 16, indicating a particular DRM format or particular content decryption key associated with the segment.

Additionally, a DRM envelope $18_i$ may comprise two encryption keys: the primary content access key and a secondary content access key associated with DRM format "i" that is capable of decrypting at least a segment of media content 16 associated with DRM format "i." According to an embodiment, use of the accessed DRM envelope to render a presentation of media content 16 may result in rendering a presentation desired by a user and a marking a portion of media content 16 decrypted using the primary content access key. The desired presentation may be rendered from decrypting media content 16 using the primary content access key obtained from the accessed envelope. The marking may be imparted from information obtained from decrypting a particular segment of media content 16 using the secondary content access key obtained from the accessed DRM envelope and associated with the particular DRM format being used to access media content 16. However, the secondary content access key may not enable decrypting segments of media content 16 capable to provide markings associated with other DRM formats. Accordingly, in one embodiment, markings identifying other DRM formats associated with unaccessed DRM envelopes 18 would not be present in decrypted and/or presented media content 16.

According to an embodiment, although claimed subject matter is not limited in this respect, DRM client 12 may be adapted to extract both primary and secondary content access keys from a particular, associated DRM envelope. Using the primary content access key, DRM client 12 may decrypt a portion of media content 16 for presentation. Upon locating segments of media content which cannot be decrypted using the first content access key, DRM client 12 may attempt to decrypt the located segments using the secondary content access key. This may be implemented using encryption key switching flags in DRM 12, as utilized in multiple encryption schemes for broadcast television, for example.

In one embodiment, a marking identifying a DRM format used to access media content may comprise a modification to decrypted media content that is not visible when rendered for presentation to a user. Such an invisible modification may comprise, for example, an invisible watermark placed in the rendered presentation. However, this is merely one example of how decrypted media content may be modified in a manner that is not visible in a presentation and claimed subject matter is not limited in this respect.

In an alternative embodiment, a marking identifying a DRM format used to access media content may comprise a visible symbol overlaid in a portion of a rendered video presentation (e.g., in an unabstructive location such as a corner). According to an embodiment, if a rendered presentation is copied or reproduced, a marking in the unencrypted data and/or presentation may remain, identifying the particular DRM format used to access media content 16 from memory 20.

Figure 2B:
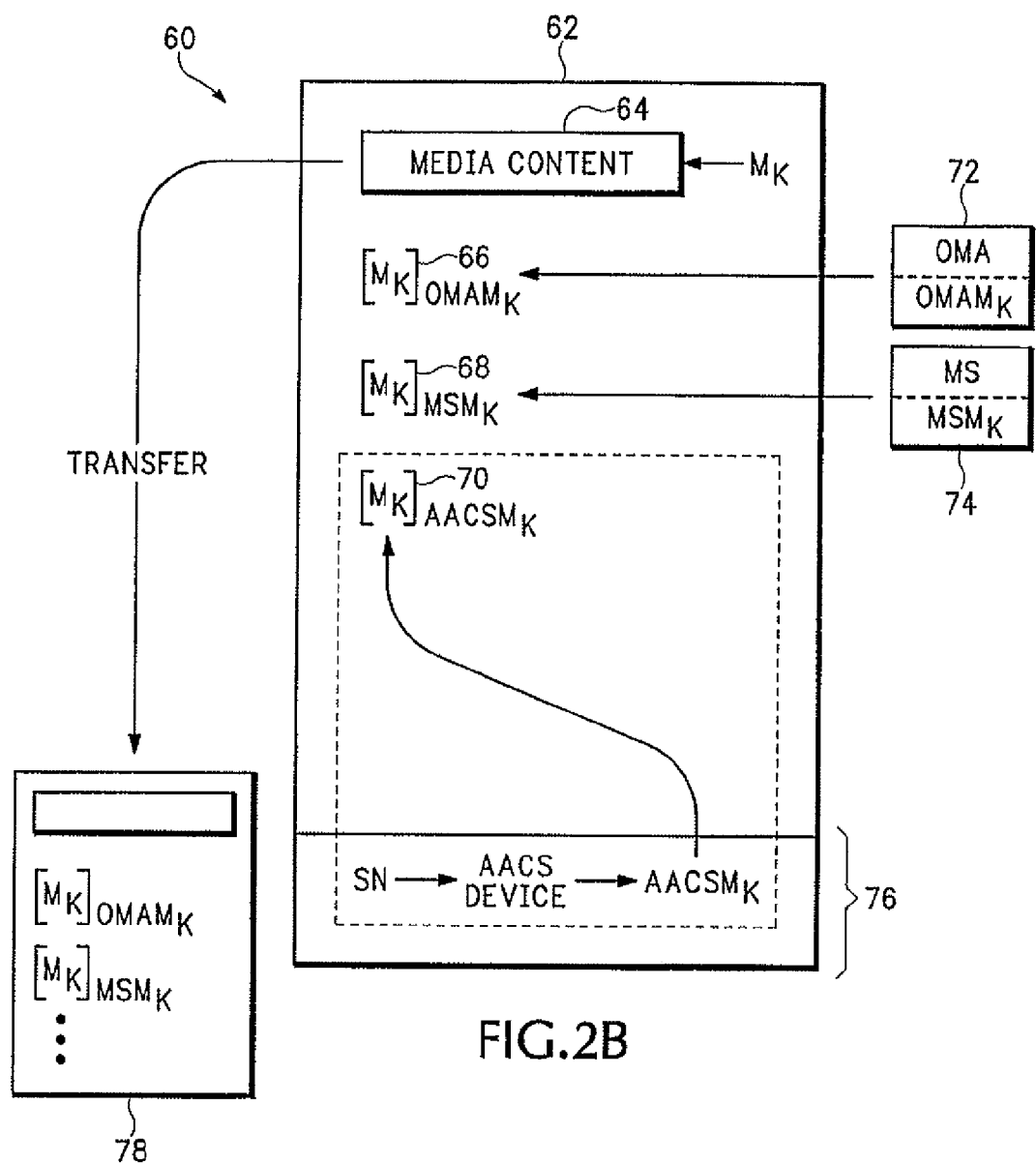
FIG. 2B is a schematic diagram illustrating access to media content protected using a DRM format according to an alternative embodiment.

FIG. 2B illustrates how protected media content 64 stored on memory 62 may be accessed according to an alternative embodiment. Media content 64 be encrypted according to a content access key $M_K$. To obtain content access key $M_K$ to access media content 64 as illustrated above, a client device (not shown) may access any one of a plurality of DRM envelopes, from an associated memory 62, such as DRM envelopes 66, 68 and 70. In one embodiment, and as illustrated above, a client device may decrypt a DRM envelope using an envelope access key associated with a particular DRM format. Here, for example, a client device may obtain such an envelope access key associated with a particular DRM format, such as key 72 or 74, from any one of several sources such as, for example, an authorization server operated by a content provider (e.g., over an Internet connection), a removable memory device, media source, media disc and/or the like.

In an alternative embodiment, an application and/or client device may access a DRM envelope to obtain content access key $M_K$ using a product serial number associated with the client device, application, media source, media disc and/or memory 62, for example. Here, portion 76 may comprise a data structure and/or executable instructions capable of providing a envelope access key $AACSM_K$ for use in decrypting DRM envelope 70 to obtain content access key $M_K$. In one embodiment, portion 76 may reside on memory 62 with media content 64 and DRM envelopes 66, 68 and 70. Alternatively, portion 76 may reside on another memory in a client device hosting an application to access media content 64. Here, for example, portion 76 may be downloaded and/or installed on a client device as part of a promotion to enable users to access media content 64 for a limited time upon purchase of a product having a particular product serial number or numbers. A client application may present such a product serial number to portion 76 for obtaining a envelope access key, shown as $AACSM_K$ in FIG. 2B, for decrypting DRM envelope 70 to obtain content access key $M_K$.

In one particular embodiment, although claimed subject matter is not limited in this respect, portion 76 may associate a product serial number with a particular DRM format. For example, such a product serial number may be associated with a device that is capable of accessing media content according to the particular DRM format. Accordingly, upon presentation of such a product serial number, portion 76 may provide a envelope access key for decrypting a DRM envelope associated with a DRM format compatible with the device associated with the presented product serial number.

According to an embodiment, information stored in memory 62 may be copied and/or transferred as a duplicate image, content or file 78 to another device such as, for example, a removable memory device. Alternatively, such information stored in memory 62 may be copied and/or transferred to devices connected to a communication network in a peer-to-peer file transfer or in a broadcast to one or multiple destinations, for example. Here, although media content 64 is being copied and/or transferred to devices other than memory 62, media content 64 may be accessed from its copied and/or transferred image by, for example, obtaining a subsequent or newly authorized envelope access key to decrypt an associated DRM envelope for obtaining content access key $M_K$ as illustrated above.

Figure 3:
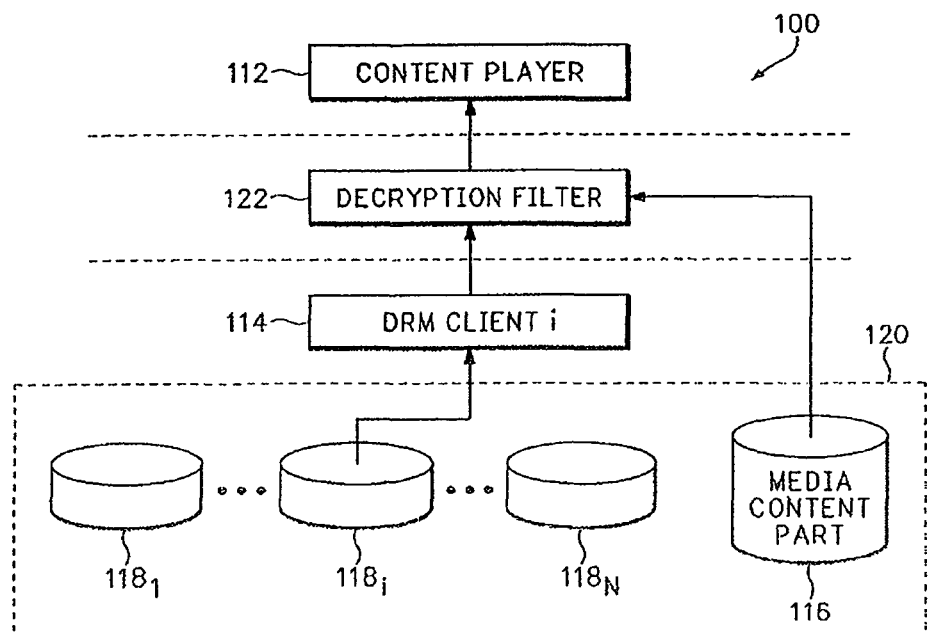
FIG. 3 is a schematic diagram of processes hosted on a device for accessing media content stored on a storage medium according to an alternative embodiment.

FIG. 3 is a schematic diagram of processes hosted on a device for accessing media content stored on a storage medium according to an alternative embodiment. A content player 112 may comprise any one of the aforementioned media players and/or embedded rendering applications identified above. In this embodiment, however, DRM client 114 may be executed to access information stored on memory 120 in advance of execution of a decryption filter 122. In this illustrative embodiment, DRM client 114 may access a portion of information stored in DRM envelope $118_i$ to extract a first key to be passed to decryption filter 122. For example, DRM client 114 may obtain the first key by decrypting the accessed portion. Using the first key, decryption filter 122 may decrypt a subsequent portion of information stored in DRM envelope $118_i$ to extract a content access key to enable decryption of media content 116. It should be understood that in other embodiments, such direction as illustrated above may be repeated more than once, with additional DRM clients and decryption filter layers, for example, without departing from claimed subject matter.

According to an embodiment, DRM clients need not employ a common encryption cipher to access media content 116. While some DRM clients may be adapted to employ an AES cipher with particular settings, other DRM clients may only be adapted to employ other, different DRM formats with different ciphers. For example, a DRM client for DRM formats such as Content Protection for Recordable Media (CPRM) used on Secure Digital (SD) flash memory cards may employ a C2 cipher and not an AES cipher. According to an embodiment, media content 116 may be encrypted according to a single cipher such as AES. If DRM client 114 is adapted only for CPRM, for example, DRM format may use a C2 cipher to decrypt a portion of DRM envelope $118_i$ to extract a content access key. Decryption filter 122 may then employ the extracted content access key to decrypt media content 116 using an AES cipher.

In a particular embodiment, although claimed subject matter is not limited in this respect, content player 112, decryption filter 122 and DRM client 114 may comprise software components provided by the same or different vendors and hosted on a single computing platform, for example. In one embodiment, one or more of these software components may be installed by a device manufacturer while others may be installed as "plug-in" modules, for example. Such plug-in modules may be installed, for example, from a removable storage medium or through selection of a universal resource indicator (URL) from a website using a browser application, for example. However, these are merely examples of how a plug-in module may be installed to a device and/or computing platform and claimed subject matter is not limited in this respect.

Figure 4:
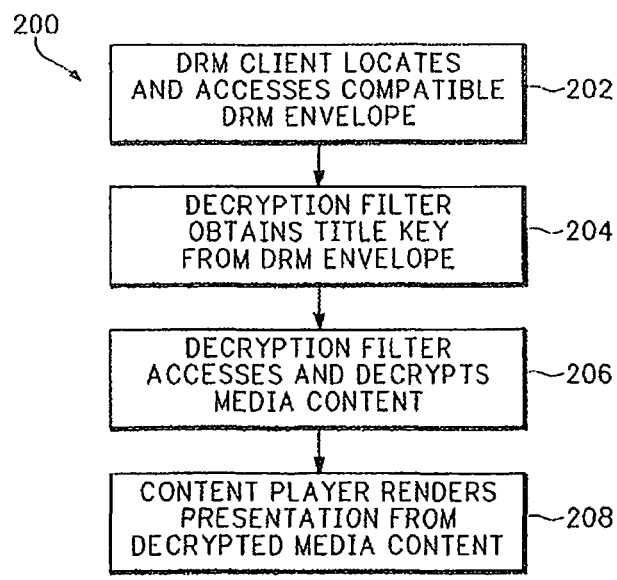
FIG. 4 is a flow diagram illustrating an alternative embodiment of a process for accessing which is protected according to a DRM format.

FIG. 4 is a flow diagram illustrating a process 200 for accessing media content provided in a DRM format according to an embodiment of processes illustrated above in FIG. 3. At block 202, DRM client 114 may locate a DRM envelope 118 associated with a compatible DRM format "i" by, as illustrated above, locating DRM envelope $118_i$ from metadata in memory 120.

By decrypting information in DRM envelope $118_i$, DRM client 114 may pass content of DRM envelope $118_i$ comprising a content access key for use in decrypting media content 116. Here, according to a particular embodiment, DRM client 114 may also pass this content access key to decryption filter 122 for decrypting media content 116. At block 204, decryption filter 122 may then decrypt the content of DRM envelope $118_i$ to obtain a content access key. At block 206 decryption filter 122 may retrieve media content 116 from memory 120 and decrypt the retrieved media content 116 using the decrypted content access key. Content player 112 may then render a presentation to a user from decrypted media content at block 208.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method for use by an authorization server to provide a client device access to an encrypted version of a media content in a media disc using a particular digital rights management (DRM) format of a plurality of DRM formats, the server including the plurality of DRM formats for supporting various encrypted versions of said media content, the method comprising:

receiving product information associated with the media disc and the client device;

using the product information associated with the media disc and the client device to locate a key associated with the particular DRM format among the plurality of DRM formats supported by the server, wherein the particular DRM format is compatible with the client device for decrypting the encrypted version of the media content using the key; and providing the key associated with the particular DRM format to the client device for decrypting the encrypted version of the media content using the key.

2. The method of claim 1, wherein providing the key is performed over an Internet connection.

3. The method of claim 1, wherein receiving the product information associated with the media disc and the client device is performed over an Internet connection.

4. The method of claim 1, wherein the product information is associated with a device for rendering a presentation based, at least in, part, on the decrypted media content.

5. The method of claim 1, wherein the product information is associated with an application for rendering a presentation based, at least in part, on the decrypted media content.

6. The method of claim 1, wherein the product information is associated with a product for accessing the media content according to the particular DRM format.

7. An authorization server for providing a client device access to an encrypted version of a media content in a media disc using a particular digital rights management (DRM) format of the plurality of DRM formats, the authorization server comprising:

a memory including the plurality of DRM formats for supporting various encrypted versions of said media content; and a computing platform configured to:

receive the product information associated with the media disc and the client device;

use the product information associated with the media disc and the client device to locate a key associated with the particular DRM format among the plurality of DRM formats supported by the server, wherein the particular DRM format is compatible with the client device for decrypting the encrypted version of the media content using the key; and provide the key associated with the particular DRM format to the client device for decrypting the encrypted version of the media content using the key.

8. The authorization server of claim 7, wherein providing the key is performed over an Internet connection.

9. The authorization server of claim 7, wherein receiving the product information associated with the media disc and the client device is performed over an Internet connection.

10. The authorization server of claim 7, wherein the product information is associated with a device for rendering a presentation based, at least in part, on the decrypted media content.

11. The authorization server of claim 7, wherein the product information is associated with an application for rendering a presentation based, at least in part, on the decrypted media content.

12. The authorization server of claim 7, wherein the product information is associated with a product for accessing the media content according to the particular DRM format.

* * * * *